2,566,789

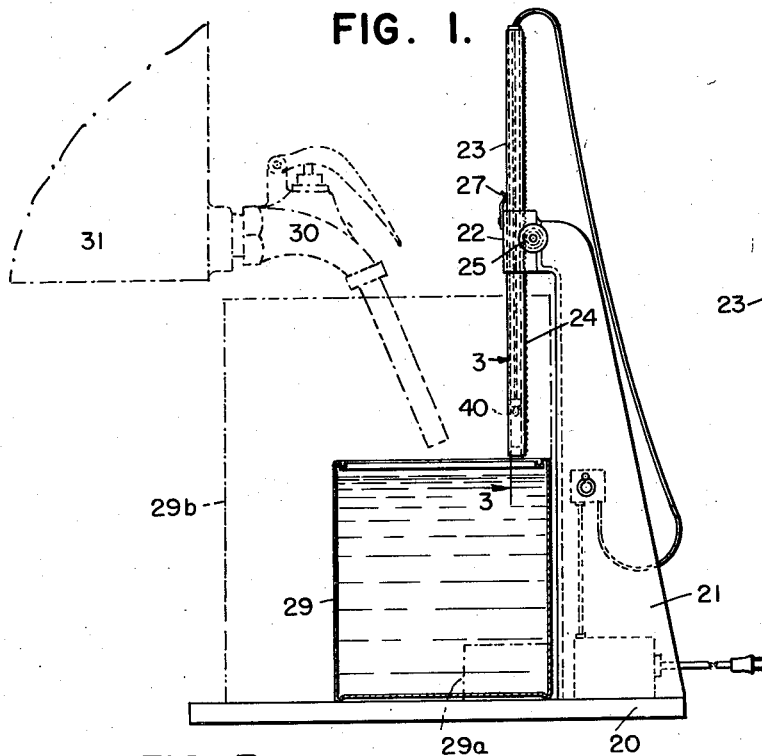
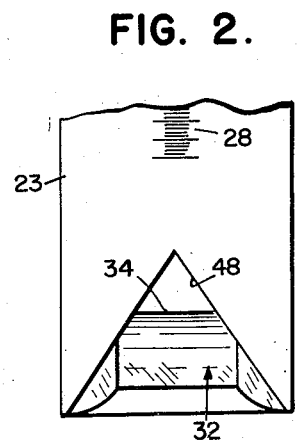
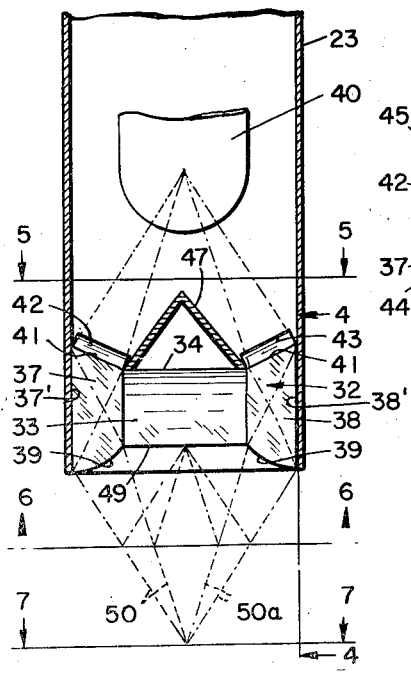
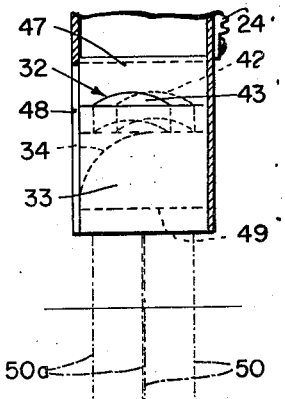
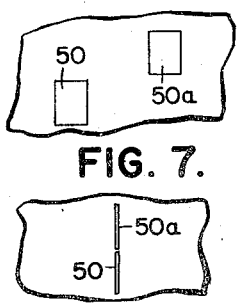
INVENTORS
ROSWELL J. BLACKINTON
FRANCIS E. STEWART
BY
*Mason & Graham*
ATTORNEYS Sept. 4, 1951    R. J. BLACKINTON ET AL    2,566,789
OPTICAL SIGHT MEANS FOR INDICATING THE LEVEL
OF LIQUIDS OR OTHER REFLECTIVE SURFACES
Filed May 15, 1947    2 Sheets-Sheet 2
FIG. 8.
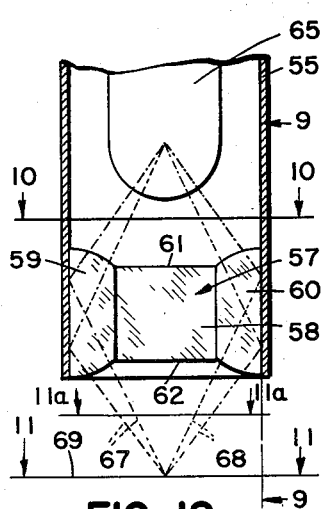
FIG. 10.
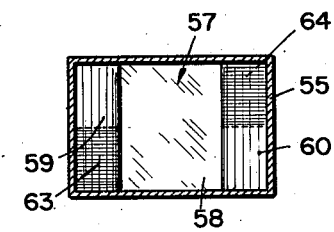
FIG. 9.
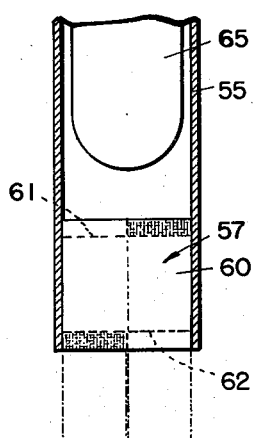
FIG. 11.
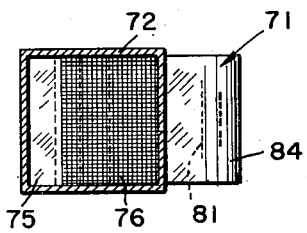
FIG. 12.
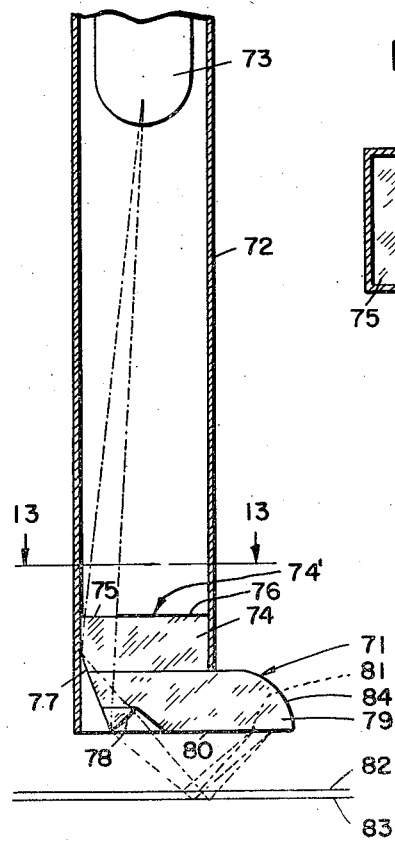
FIG. 13.
INVENTORS
ROSWELL J. BLACKINTON
FRANCIS E. STEWART
BY
ATTORNEYS Patented Sept. 4, 1951

UNITED STATES PATENT OFFICE 2,566,789

OPTICAL SIGHT MEANS FOR INDICATING THE LEVEL OF LIQUIDS OR OTHER REFLECTIVE SURFACES

Roswell J. Blackinton, Whittier, and Francis E. Stewart, Los Angeles, Calif., assignors to Western States Lacquer Corporation, Los Angeles, Calif., a corporation of California Application May 15, 1947, Serial No. 748,366

1 Claim. (Cl. 88—1)

The present invention relates to an indicator, and more particularly to an indicator which is adapted to indicate optically when a light reflecting or intercepting surface is at a predetermined distance from the indicator.

There are numerous requirements, in industry, commerce and science and other fields, where it is desirable to determine liquid or other levels with exactness. For example, in filling containers with various liquids for sale, such, for example, as paint, it is desirable to introduce into each container an exact required amount of liquid, but no more. Any additional liquid beyond such required amount represents a direct loss to the packer.

Surface tension of a liquid causes irregularities in the readings of a rising column of liquid on a measuring instrument inserted in the liquid. Also, in the case of heavy or viscous liquids such as paint, the liquid has a tendency to cover and conceal measuring indicia on any instrument introduced into the liquid.

An object of the present invention is to make an improved and simplified optical liquid level indicator.

Another object is to make an optical instrument which will indicate accurately the position of the upper surface of a liquid when it reaches a predetermined height relatively to the instrument.

Another object is to make an improved optical distance indicator which can be interpreted directly by the interception of light rays by the surface, or by light rays reflected back from such surface into predetermined focused indicating position on the indicator.

Another object is to make an instrument having a light source with lens and light impact surfaces arranged to focus angularly directed beams from the light source on a surface at a predetermined distance from the device.

Another object is to make a liquid container support with an optical liquid level measuring device mounted above the container at adjusted heights for ascertaining the attainment of predetermined liquid levels in a container supported thereby.

Illustrative embodiments of the invention, for attaining these and other objects, are set forth in the following description and in the accompanying drawings, comprising two sheets. In the drawings:

Fig. 1 is a view in side elevation of an optical liquid level indicating device and supporting stand embodying the present invention;

Fig. 2 is an enlarged fragmentary front elevational view of the lower end of a rectangular light and lens tube embodied in the device shown in Fig. 1;

Fig. 3 is a similarly enlarged fragmentary sectional view taken on the line 3—3 of Fig. 1;

Fig. 4 is a similar enlarged fragmentary sectional view taken on the line 4—4 of Fig. 3;

Fig. 5 is a transverse sectional view taken on the line 5—5 of Fig. 3;

Fig. 6 is a fragmentary view showing how light beams projected by the device would appear when focused on a reflecting surface interposed in the plane of the line 6—6 of Fig. 3;

Fig. 7 is a view similar to that of Fig. 6, showing the light beams as they would appear on a surface interposed in the plane of the line 7—7 of Fig. 3;

Fig. 8 is a sectional view similar to that of Fig. 3, but showing a modified lens arrangement;

Fig. 9 is a sectional view taken on the line 9—9 of Fig. 8;

Fig. 10 is a view taken on the line 10—10 of Fig. 8;

Fig. 11 is a fragmentary view showing, in solid lines, how the light beams would appear when focused on a surface interposed in the plane of the line 11—11 of Fig. 8, the dot-dash lines in this figure indicating how the light beams would appear on a surface interposed in the plane of the dot-dash line 11a—11a in Fig. 8;

Fig. 12 is a fragmentary transverse vertical sectional view of a modified lens and lens tube arrangement for securing a surface level indication with reflected light rays only; and Fig. 13 is a sectional view taken on the line 13—13 of Fig. 12.

Referring first to the structure shown in Figs. 1 to 5 inclusive, a base 20 has an upright stand 21 secured thereon. A rectangular vertical lens tube bushing 22 is offset laterally from the upper end of the stand.

A rectangular light and lens tube 23, having a toothed rack 24 affixed to one side thereof, is inserted slidably in the bushing 22. A thumb screw 25 is secured to a pinion (not shown) mounted to have toothed engagement with the rack 24 for vertical adjustment of the lens tube. A spring clip 27 is mounted on the upper end of the bushing 22, and has resilient frictional engagement with the lens tube 23 to hold it in vertically adjusted position.

A side of the lens tube preferably is provided with a scale 28 having suitable markings with numbered indicia to indicate the position of the tube relatively to the bushing. This scale need have no relation to a volume of liquid to be measured, since the device may be used for measuring liquid levels in different sizes of containers. For example, the base 20 is adapted to support, in addition to a container 29 shown in solid lines in Fig. 1, containers of any size between an extremely small container such as that indicated by the dot-dash line 29a and the large one indicated by the dot-dash lines 29b. Other suitable arrangements for mounting the lens tube may be readily devised by one familiar with the art.

Means for introducing liquid to be measured into the container may comprise, for example, a faucet 30, arranged to discharge from a suitable supply of liquid, such as a reservoir 31.

In the lower end of the lens tube, a lens arrangement 32, shown in Figs. 3, 4 and 5, may be of a suitable lens material such as glass or a refracting plastic. In this particular lens arrangement a central portion 33 is of generally rectangular shape with the exception of one side 34 thereof, which has a cylindrical curve, as shown best in dotted lines in Fig. 4. Two end lens portions 37 and 38 may be formed integrally with the central portion 33, or they may be cut from suitable material, for example, a cylindrical rod having a radius equal to that required by the curvatures of the lower faces 39 of these end portions. These cylindrically curved lower lens faces 39 are disposed with their axes of curvature parallel to each other, and disposed as illustrated in Fig. 3 to focus two beams of light from a lamp 40 in a manner to be brought out later herein.

The top surfaces 41 of the end lens portions 37 and 38 are planiform, and are disposed at slight inward slopes toward the central lens portion 33, as best shown in Fig. 3. A pair of short, transverse cylindrical lens portions 42 and 43 are mounted on the planiform top surfaces of these end portions. The axes of the cylindrical curves of these upper cylindrical lenses are disposed at right angles to the axes of the lower cylindrical lens faces 39. These upper cylindrical lens portions may be formed integrally with the end lens portions 37 and 38, or by cutting them from a round rod having the proper refractive characteristics and radius of curvature. They then may be secured as by suitable transparent cement in required positions. These upper cylindrical lens portions 42 and 43 are disposed with their axes of curvature offset laterally from each other. The top surfaces of the end lens portions 37 and 38, on both sides of these top cylindrical lens portions, as at 44 and 45, are made opaque; for example, by adhesively securing thereon pieces of opaque sheet material, or by painting them with opaque paint.

The inner ends of the upper cylindrical lens portions 42 and 43 slope inwardly over the side edges of the central lens portion 32. An opaque shield 47 of inverted V-shape, which may be of metal, is of a length equal to the width of the central lens portion 33. The straight edges of this member are inserted slidably beneath the sloping end portions of the lenses 42 and 43, as illustrated in Fig. 3. A sighting notch 48 of inverted V-shape is cut in the lower edge of the outer wall of the lens tube 23, of a size substantially to fit along the outer edge of the shield 47. The term "outer" is used to refer to the side of the lens tube farthest from the upright stand 21.

The lower face 49 of the central lens portion 33 is frosted, so that when reflected beams of light strike this frosted lens face or target they will form images which will be visible through the curved forward side 34 of the central lens portion. This curved lens face 34 acts as a magnifying lens for such purpose. The sighting notch 48 exposes this curved lens face, and the shield 47 shields the central lens portion from the direct rays from the lamp 40.

The general path of the light rays is indicated in Fig. 3 and Fig. 4. From the luminous filament of the lamp, which preferably has a small area of radiation for sharp focusing, light rays are directed through the axially offset upper cylindrical lenses 42 and 43. All other top surfaces of the lens assembly are shielded from the direct rays of the lamp, as mentioned previously herein. The light rays passing through the cylindrical lens portions 42 and 43 are offset laterally from each other by the action of their axially offset lenses. The light rays then are reflected from the end surfaces 37', 38' of the end lens portions 37 and 38 in a manner known in the art and emerge through the cylindrical lower lens faces 39. The curvature of these lower lens faces 39 is such as to focus the emerging light beams 50 and 50a into two sharply focused and longitudinally aligned patterns as at 50 and 50a (see Fig. 7) a predetermined distance below the bottom of the lens tube, the beams 50 and 50a being offset in parallel. Since the emerging light beams 50 and 50a are directed at opposite angles to each other, the light patterns or images produced by the beams on a surface interposed across their path will lose their sharpness of focus and will move in opposite directions from each other when the distance of the interposed surface from the bottom of the lens tube is changed. Thus there is only one distance at which the light patterns 50 and 50a will be in sharp focus and in exact alignment with each other. If the interposed surface against which the light beams are directed is of a reflecting nature, such as the surfaces of most liquids, the light rays of the beam 50 and 50a will be reflected back onto the ground lower surface 49 (see Figs. 3 and 4) of the central lens portion 33. Therefore, when the distance between the bottom of the lens and the interposed reflecting surface is correct, the light beams will be sharply focused on the ground lower surface of the lens and in exactly aligned relation, similar to that shown in Fig. 7. The light images are readily visible in magnified form through the cylindrical lens face 34 (shown in broken lines in Fig. 4) which is visible through the notch in the lower end of the lens tube 23.

In the form of the invention shown in Figs. 8, 9 and 10, a lens tube 55 may be similar to the tube 23, with the exception that the notch 48 may be omitted from its lower end. A lens 57 is mounted in the lower end of the lens tube 55. The lens 57 has a generally rectangular central portion 58. The upper and lower faces 61 and 62, respectively, of the central portion 58 are made opaque. End lens portions 59 and 60 are provided on the ends of the central portion 58. These end portions are the only portions which act as lenses in this embodiment of the invention, the central portion 58 comprising nothing more than a support for these end portions. One half of each of the lower faces of the cylindrical lens portions 59 and 60 are made opaque on opposite sides of a central line transversely bisecting both of said lower lens faces, as at 63 and 64.

Without attempting to depict accurately the exact path of the light rays from a lamp 65 mounted in the lens tube 55, the general effective path of the light beams emitted by the device will be as indicated somewhat diagrammatically in Fig. 11. As indicated, the light rays will pass through the upper cylindrical faces of the end lens portions 59 and 60, and will be reflected back from the end surfaces of the end lenses 59 and 60. The light rays will emerge in contracting beams 67 and 68, from the exposed opposite halves of the lower cylindrical faces of the end lens portions 59 and 60. These beams will focus in exact alignment, as shown in solid lines 67a and 68a in Fig. 11, when intercepted by a surface 69 interposed at a predetermined distance from the lens. As the intercepting surface is moved inwardly or outwardly from the lens, the light beams will become out of focus and their images on the intercepting surface will appear to move in opposite directions from each other, as indicated at 67b and 68b in Fig. 11.

In the further modified form of the invention shown in Figs. 12 and 13, a lens 71 is mounted in a lens tube 72 similar to those previously described, and has a lamp 73 mounted therein, also in a manner similar to the previously described arrangements. A lens 74 is mounted in the lower end of the lens tube, the upper surface 74' of the lens being planiform, and made opaque at 76, with the exception of a slit 75 at one marginal portion thereof. The side 77 of the lens below this open strip is formed at an acute angle to light rays passing through this open slit 75 from the lamp 73. The angle of this side of the lens is such as to reflect the light rays out through a cylindrically curved lens face 78 formed in the lower side of the lens, with its chord disposed approximately at right angles to the mean axis of the reflected light beam from the sloping lens face 77. A laterally projecting lens portion 79 has a frosted lower face 80 with a hair line 81 (see Fig. 13) inscribed therein. This hair line is located at the point at which the light beam emerging from the curved lens face 78 will focus sharply when reflected by a reflecting interposed surface 82, when interposed across the beam at right angles to the axis of the lens tube 72, and a predetermined distance from the bottom of the lens 71. It will be apparent to those familiar with the art that as the distance from the reflecting surface to the bottom surface of the lens changes, for example, by moving downward to the position indicated by the line 83, the reflected image of the beam on the ground lower face of the lens extension 79 will move away from the hair line 81, and simultaneously will lose its sharpness of focus. A cylindrically curved lens face 84 formed in the end of the lateral lens extension 79 serves to magnify the hair line and the reflected image of the light beam, and therefore assists in determining more accurately the liquid level as determined by the reflected image of the light beam on the ground lens surface 80.

While we have illustrated and described our invention in some of its presently preferred forms, it will be apparent to those familiar with the art that the invention is capable of further modification without departing from the spirit of the invention. Also, while we have stated that the device is intended primarily for the indicating of liquid levels, it is clearly apparent that the device will operate on any surface capable of intercepting or reflecting light rays. It is desired, therefore, not to limit the invention except as set forth in the following claim.

We claim:

A liquid level indicator adapted to be mounted at a predetermined height above a desired liquid level in a container, said indicator comprising an opaque lens tube having a bottom opening therein, a light source mounted in said tube to direct light rays from the light source toward the bottom opening, a lens mounted in said opening, said lens having a central portion with a translucent bottom surface and a curved side face, the tube being cut away to expose the translucent lens bottom through the curved side face, means shielding the central lens portion from direct light rays from the light source, a pair of curved lens faces on opposite sides of the shielded central lens portion adapted to deflect light rays from the light source into two converging beams adapted to cross each other at their focal centers in laterally adjacent relation a fixed distance below the center of the flat central lens portion, said converging rays being adapted to be reflected back into sharply focused laterally adjacent images on the translucent bottom surface of the lens central portion by a liquid surface a predetermined distance below the translucent lens surface.

ROSWELL J. BLACKINTON.
FRANCIS E. STEWART.

REFERENCES CITED

The following references are of record in the file of this patent:

UNITED STATES PATENTS

| Number | Name | Date |
|---|---|---|
| 1,489,838 | Kohler | Apr. 8, 1924 |
| 1,854,665 | Parker | Apr. 19, 1932 |
| 1,991,192 | Bucky | Feb. 12, 1935 |
| 2,269,737 | Rogers | Jan. 13, 1942 |
| 2,316,751 | Adler, Jr. | Apr. 20, 1943 |
| 2,376,836 | Tunnicliffe | May 22, 1945 |
| 2,379,698 | Fischer | July 3, 1945 |
| 2,476,674 | McCauley | July 19, 1949 |